(12) United States Patent
Li et al.

(10) Patent No.: US 11,350,389 B2
(45) Date of Patent: May 31, 2022

(54) SEMI-PERSISTENT RESOURCE ALLOCATION ENHANCEMENT FOR V2X COMMUNICATION

(71) Applicant: Nokia Technologies Oy, Espoo (FI)

(72) Inventors: Haitao Li, Beijing (CN); Ling Yu, Kauniainen (FI); Vinh Van Phan, Oulu (FI); Jedrzej Stanczak, Poznan (PL)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 16/089,569

(22) PCT Filed: Apr. 7, 2016

(86) PCT No.: PCT/CN2016/078662
§ 371 (c)(1),
(2) Date: Sep. 28, 2018

(87) PCT Pub. No.: WO2017/173616
PCT Pub. Date: Oct. 12, 2017

(65) Prior Publication Data
US 2020/0305138 A1  Sep. 24, 2020

(51) Int. Cl.
*H04W 72/04*  (2009.01)

(52) U.S. Cl.
CPC ................ *H04W 72/0406* (2013.01)

(58) Field of Classification Search
CPC ........... H04W 72/1257; H04W 72/042; H04W 48/16; H04W 72/04; H04W 28/06;
(Continued)

(56) References Cited

U.S. PATENT DOCUMENTS

2010/0085927 A1  4/2010  Torsner et al.
2010/0248765 A1*  9/2010  Chun ............... H04W 72/042
                                        455/509

(Continued)

FOREIGN PATENT DOCUMENTS

CN  101646239 A  2/2010
CN  101932039 A  12/2010

(Continued)

OTHER PUBLICATIONS

"Feasibility Study on LTE-based V2X Services", 3GPP TSG RAN meeting #71, RP-16yyyy, Agenda item: 10.5.3, Mar. 7-10, 2016, pp. 1-9.

(Continued)

*Primary Examiner* — Dady Chery
(74) *Attorney, Agent, or Firm* — Nokia Technologies Oy (57) ABSTRACT

Various communication systems benefit from suitable allocation. For example, system for vehicle to X communication may benefit from semi-persistent resource allocation mechanisms, for example, for uplink semi-persistent scheduling. A method can include configuring at least one main semi-persistent scheduling occasion to a user equipment. The method can also include configuring at least one subsequent semi-persistent scheduling occasion to the user equipment. The at least one subsequent semi-persistent scheduling occasion can depend on usage of the at least one main semi-persistent scheduling occasion.

22 Claims, 4 Drawing Sheets

(58) Field of Classification Search
CPC ......... H04W 72/1289; H04W 28/0252; H04W 72/0406; H04W 72/0413; H04L 1/1819; H04L 1/1877; H04L 5/00
See application file for complete search history.

(56) References Cited

U.S. PATENT DOCUMENTS

| | | |
|---|---|---|
| 2013/0195066 A1 | 8/2013 | Lee et al. |
| 2015/0085728 A1 | 3/2015 | Majjigi et al. |
| 2015/0117342 A1* | 4/2015 | Loehr ............... H04W 72/1284 370/329 |

FOREIGN PATENT DOCUMENTS

| | | |
|---|---|---|
| CN | 103974438 A | 8/2014 |
| CN | 104521304 A | 4/2015 |
| WO | 2015/058382 A1 | 4/2015 |

OTHER PUBLICATIONS

"Challenges and Potential Enhancements for Uu Based V2V", 3GPP TSG-RAN WG2 #93, R2-161659, Agenda Item : 7.11, LG Electronics Inc., Feb. 15-19, 2016, pp. 1-7.

"Discussion on Uu Enhancements for V2X", 3GPP TSG-RAN WG2 #93, Tdoc R2-161565, Agenda Item: 7.11, Ericsson, Feb. 15-19, 2016, pp. 1-8.

International Search Report and Written Opinion received for corresponding Patent Cooperation Treaty Application No. PCT/CN2016/078662, dated Jan. 11, 2017, 11 pages.

Extended European Search Report received for corresponding European Patent Application No. 16897551.4, dated Oct. 17, 2019, 8 pages.

"SPS Enhancements for V2X over Uu", 3GPP TSG RAN WG2 #93bis, R2-162398, ZTE, Agenda : 8.11.1, Apr. 11-15, 2016, 3 pages.

"Uu Enhancements for V2X", 3GPP TSG RAN WG1 Meeting #84bis, R1-162831, Ericsson, Agenda : 7.3.9.2, Apr. 11-15, 2016, 3 pages.

Office action received for corresponding European Patent Application No. 16897551.4, dated Feb. 8, 2021, 5 pages.

Office action received for corresponding Chinese Patent Application No. 201680086533.3, dated May 31, 2021, 9 pages of office action and 4 pages of Translation available.

"On sensing with semi-persistent transmission for V2V sidelink", 3GPP TSG-RAN WG2 #93bis, R2-162831, InterDigital, Agenda : 8.2.1, Apr. 11-15, 2016, pp. 1-3.

Office action received for corresponding Chinese Patent Application No. 201680086533.3, dated Nov. 30, 2021, 7 pages of office action and 4 pages of Translation available.

\* cited by examiner

SEMI-PERSISTENT RESOURCE ALLOCATION ENHANCEMENT FOR V2X COMMUNICATION

RELATED APPLICATION

This application was originally filed as Patent Cooperation Treaty Application No. PCT/CN2016/078662 filed Apr. 7, 2016.

BACKGROUND

Field

Various communication systems benefit from suitable allocation. For example, system for vehicle to X communication may benefit from semi-persistent resource allocation mechanisms, for example, for uplink semi-persistent scheduling.

Description of the Related Art

Vehicle to X (V2X) communication is relevant to long term evolution (LTE) and fifth generation (5G) communication systems. V2X can encompass communications between vehicles (V2V), vehicle-to-infrastructure (V2I), vehicle to network (V2N), as well as communications between vehicles and other devices.

V2X low latency and high capacity requirements may require some enhancements on the network in order to support V2X services. Semi-persistent scheduling (SPS) may be used rather than dynamic scheduling to allocate the resource in the radio interface for the communication between a terminal device (such as a vehicle or other device) and the radio access network. This interface can be the Uu interface. V2X communication in UL may particularly benefit from using SPS, in terms of latency and signaling overhead. However, the current study shows that there is a challenge to meet V2X latency requirements using legacy LTE SPS, especially in high vehicle density scenario such as urban area where many cars are moving in low velocity.

V2X traffic may be largely unpredictable in terms of packet size and packet generation frequency. For example, the packet generation interval for cooperative awareness messages (CAM) may depend on the V2X application and can vary from 100 ms to 1 s. The triggering for packet generation can be influenced by external conditions, such as vehicle geographical position, speed, direction, traffic density, and the like.

Variable header size and variable packet periodicity in higher layers can also make prediction of V2X message size and interval challenging. For example, security components such as certificates or digests can contribute to affecting the message size. Moreover, the terminal device, which can be any kind of user equipment (UE), may need to use multiple V2X services, for example V2N for traffic flow optimization, V2I or V2V for more local road safety services, and so on, each possibly having its own respective periodicity and packet size(s).

LTE has specified SPS for UL scheduling in the following way: radio resource control (RRC) defines the periodicity of the semi-persistent uplink grant and physical downlink control channel (PDCCH) indicates whether the uplink grant is a semi-persistent one. Thus, PDCCH indicates whether the uplink grant can be implicitly reused in the following transmission time intervals (TTIs) according to the periodicity defined by RRC.

In sub-frames where the UE has semi-persistent uplink resources, if the UE cannot find its cell radio network temporary identifier (C-RNTI) on the PDCCH(s), an uplink transmission according to the assigned semi-persistent allocation in the TTI can be made. The network decodes the pre-defined physical resource blocks (PRBs) according to the pre-defined MCS. Otherwise, in the sub-frames where the UE has semi-persistent uplink resource and if the UE finds its C-RNTI on the PDCCH(s), the PDCCH allocation overrides the persistent allocation for that TTI and the UE's transmission complies with the PDCCH allocation, not with the semi-persistent allocation.

SUMMARY

According to certain embodiments, a method can include configuring at least one main semi-persistent scheduling occasion to a user equipment. The method can also include configuring at least one subsequent semi-persistent scheduling occasion to the user equipment. The at least one subsequent semi-persistent scheduling occasion can depend on usage of the at least one main semi-persistent scheduling occasion.

In certain embodiments, a method can include receiving, at a user equipment, a configuration of at least one main semi-persistent scheduling occasion. The method can also include receiving, at the user equipment, a configuration of at least one subsequent semi-persistent scheduling occasion. The method can further include operating the user equipment to communicate at least using the main semi-persistent scheduling occasion. The at least one subsequent semi-persistent scheduling occasion can depend on usage of the at least one main semi-persistent scheduling occasion.

An apparatus, according to certain embodiments, can include means for configuring at least one main semi-persistent scheduling occasion to a user equipment. The apparatus can also include means for configuring at least one subsequent semi-persistent scheduling occasion to the user equipment. The at least one subsequent semi-persistent scheduling occasion can depend on usage of the at least one main semi-persistent scheduling occasion.

An apparatus, in certain embodiments, can include means for receiving, at a user equipment, a configuration of at least one main semi-persistent scheduling occasion. The apparatus can also include means for receiving, at the user equipment, a configuration of at least one subsequent semi-persistent scheduling occasion. The apparatus can further include means for operating the user equipment to communicate at least using the main semi-persistent scheduling occasion. The at least one subsequent semi-persistent scheduling occasion can depend on usage of the at least one main semi-persistent scheduling occasion.

According to certain embodiments, an apparatus can include at least one processor and at least one memory including computer program code. The at least one memory and the computer program code can be configured to, with the at least one processor, cause the apparatus at least to configure at least one main semi-persistent scheduling occasion to a user equipment. The at least one memory and the computer program code can also be configured to, with the at least one processor, cause the apparatus at least to configure at least one subsequent semi-persistent scheduling occasion to the user equipment. The at least one subsequent semi-persistent scheduling occasion can depend on usage of the at least one main semi-persistent scheduling occasion.

In certain embodiments, an apparatus can include at least one processor and at least one memory including computer program code. The at least one memory and the computer program code can be configured to, with the at least one processor, cause the apparatus at least to receive, at a user equipment, a configuration of at least one main semi-persistent scheduling occasion. The at least one memory and the computer program code can also be configured to, with the at least one processor, cause the apparatus at least to receive, at the user equipment, a configuration of at least one subsequent semi-persistent scheduling occasion. The at least one memory and the computer program code can be further configured to, with the at least one processor, cause the apparatus at least to operate the user equipment to communicate at least using the main semi-persistent scheduling occasion. The at least one subsequent semi-persistent scheduling occasion can depend on usage of the at least one main semi-persistent scheduling occasion.

A computer program product can, in certain embodiments, include instructions for performing a process. The process can be any of the above-described methods.

A non-transitory computer-readable medium can, according to certain embodiments, be encoded with instructions that, when executed in hardware, perform a process. The process can be any of the above-described methods.

BRIEF DESCRIPTION OF THE DRAWINGS

For proper understanding of the invention, reference should be made to the accompanying drawings, wherein.

DETAILED DESCRIPTION

Certain embodiments may adapt semi-persistent scheduling (SPS) transmissions to potentially inconsistent V2X message generation intervals and message sizes, while taking such V2X traffic characteristics into account. Furthermore, certain embodiments may provide SPS enhancement with multiple interactive SPS occasions within one SPS interval. Such enhancement may permit better alignment between SPS transmissions and V2X message generation time, interval, and packet size.

Figure 1:
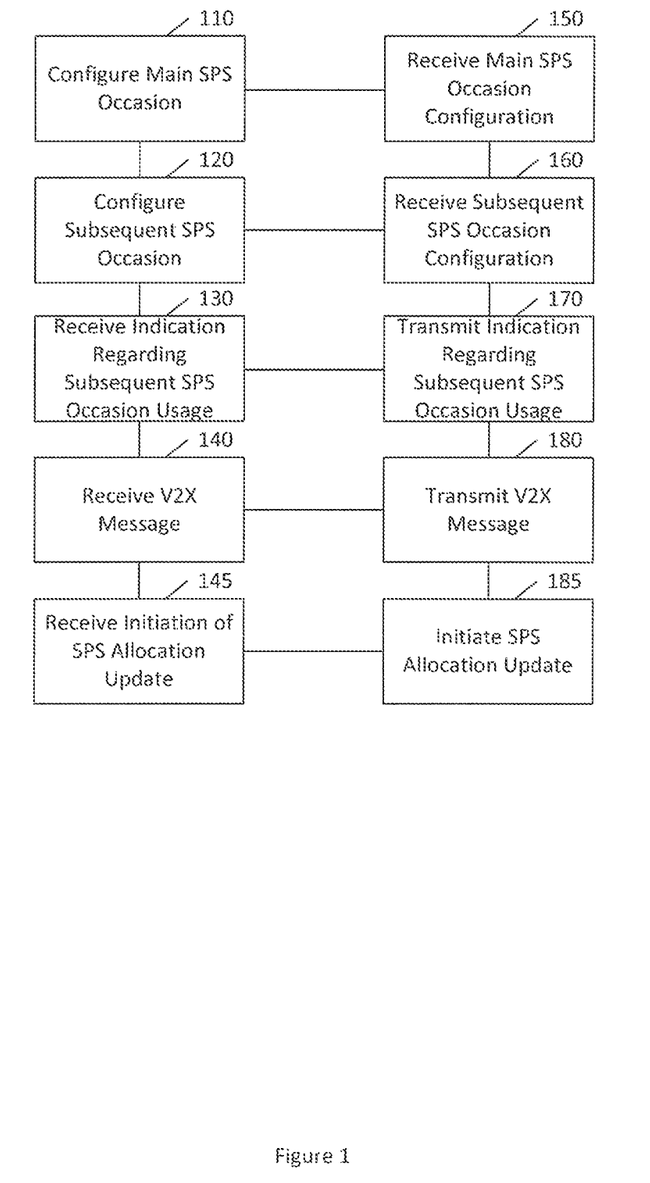
FIG. 1 illustrates a method according to certain embodiments.

FIG. 1 illustrates a method according to certain embodiments. As shown in FIG. 1, a method can include, at 110, configuring at least one main semi-persistent scheduling occasion to a user equipment. This configuration can be received at the user equipment at 150.

The method can also include, at 120, configuring at least one subsequent semi-persistent scheduling occasion to the user equipment. This configuration can be received at the user equipment at 160. As will be discussed below, the at least one subsequent semi-persistent scheduling occasion can depend on usage of the at least one main semi-persistent scheduling occasion. This dependency can have various forms, but in certain embodiments the transmission in the main semi-persistent scheduling occasion can be used to indicate whether one or more of the subsequent semi-persistent scheduling occasions are to be used (see the discussion of blocks 130 and 170, below), and/or to what extent they are to be used.

The configuration of the at least one main semi-persistent scheduling occasion and the at least one subsequent semi-persistent scheduling occasion can include indicating any of the following: a semi-persistent scheduling interval, a semi-persistent scheduling occasion interval, a main semi-persistent scheduling occasion, and a subsequent semi-persistent scheduling occasion.

The method can additionally include, at 145, receiving, in a same transmission with the indication or in a different transmission from the indication, an initiation of an update of semi-persistent scheduling allocation. This can involve the user equipment, at 185, initiating an update of semi-persistent scheduling allocation with the indication. Alternatively, the update of semi-persistent scheduling allocation can be provided as RRC signaling transmitted in any uplink transmission grant, not limited to merely SPS UL grants. The update can include updating physical resource blocks and modulation and coding scheme of the semi-persistent scheduling allocation. Alternatively, the update can include upgrading a particular subsequent semi-persistent scheduling occasion to be another main semi-persistent scheduling occasion.

Thus, the information represented in blocks 130, 140 and 145 (see the additional discussion below) can be transmitted together in the transmission that happened in a main SPS occasion (M_SPS_O) if there is corresponding data to transmit. The information in block 130 may transmit in every M_SPS_O. Block 140 may happen if there is V2X message in the buffer to wait for transmission. Moreover, block 145 may happen if a vehicle device wants to change PRBs and MCS or request the upgrade of S_SPS_O to M_SPS_O.

The configuring the at least one main semi-persistent scheduling occasion and the at least one subsequent semi-persistent scheduling occasion can be performed using radio resource control signaling, medium access control signaling, physical layer control signaling, or any combination thereof. The configuring the at least one main semi-persistent scheduling occasion and the at least one subsequent semi-persistent scheduling occasion can be performed using a single grant or using different grants.

The configuring the at least one main semi-persistent scheduling occasion can be performed implicitly or explicitly together with an uplink grant.

The method can further include, at 130, receiving an indication from the user equipment, transmitted at 170, regarding whether the at least one subsequent semi-persistent scheduling occasion will be used for uplink transmission. The method can additionally include, at 140, receiving, transmitted at 180 in a same transmission with the indication or in a different transmission from the indication, an uplink data message, such as a vehicle to X message. The indication can be or include an uplink scheduling request corresponding to a size of data to be transmitted.

Certain embodiments provide inter-dependency and interaction between multiple SPS occasions within one SPS interval. Such inter-dependency and interaction may permit better adaption of SPS to variable V2X message generation frequency and message size and may result in more efficient resource utilization.

For example, in certain embodiments there may be multiple inter-dependent SPS occasions in one SPS interval. These occasions can be configured to a UE by the serving eNB or other access node. These occasions can include at least one main SPS occasion (M_SPS_O). Each M_SPS_O can be followed by at least one subsequent SPS occasion (S_SPS_O).

The actual use and adaptation of S_SPS_O can be indicated to the serving eNB by the UE in a corresponding M_SPS_O. Further characterization and detailed operation of M_SPS_O and S_SPS_O are discussed below. In a special case, inter-dependency of M_SPS_O and associated S_SPS_O may be realized between two consecutive SPS occasions.

In certain embodiments, the interval of different SPS occasions may be configured by RRC signaling. In this case, the multiple SPS occasions may be activated by one PDCCH grant, as the UE may know the next SPS occasion based on the configured SPS occasion interval. This can be referred to as a single grant activation. In another option, the multiple SPS occasions may be activated by different PDCCH grants if, for example, different physical resource blocks (PRBs) and modulation and coding schemes (MCS) in different SPS occasions are preferred. This can be referred to as a multiple grant activation, or activation using different grants.

In certain embodiments, the interval of different SPS occasions may be configured dynamically by using PDCCH to activate multiple SPS occasions. In this case, the update of SPS occasion interval may be more flexible, as no RRC signaling may be involved.

In certain embodiments, M_SPS_O may be indicated explicitly in PDCCH together with UL grant or may be implicitly defined as, for example, the first SPS occasion that is activated by PDCCH UL grant in the SPS interval.

The UE can have UL transmission in M_SPS_O. The UL transmission can include some information on S_SPS_O, such as to whether the S_SPS_Os will be used for UL transmission or not.

In certain embodiments, the UL transmission in M_SPS_O may include the actual V2X message in addition to the information on S_SPS_Os.

In certain embodiments, the information on S_SPS_Os may be a one bit indication for each S_SPS_O to indicate whether the corresponding S_SPS_O will be used for UL transmission or not. In this case, which can be referred to as a bitmap, the one-bit indication of each S_SPS_O may be implemented in physical uplink control channel (PUCCH) or as medium access control (MAC) control protocol data unit (C-PDU).

In certain embodiments, the information on S_SPS_Os may include also PRBs and MCS information of the corresponding UL SPS transmissions in S_SPS_Os. This information may be considered as a UE initiated update of SPS allocation. Alternatively, the information on S_SPS_Os may include an UL scheduling request (SR) for a certain TB size.

In certain embodiments, the decision as to whether S_SPS_Os will be used for UL transmission or not and optionally the PRB and MCS information or SR of the indicated TB size may be based on the waiting time or the delay and the amount of the data of V2X messages in the UL buffer.

In certain embodiments, S_SPS_O may be implicitly or explicitly upgraded to M_SPS_O. This upgrade may be triggered either by the explicit request from the UE as discussed below or implicitly by an UL SPS transmission in M_SPS_O that includes only the information of S_SPS_O without the actual V2X message, in order to better align M_SPS_O with V2X message generation timing. The implicit upgrade may be applied to S_SPS_O next to M_SPS_O. The explicit upgrade may be indicated by the eNB in the intended S_SPS_O with PDCCH signaling.

In certain embodiments, the upgrade of S_SPS_O to M_SPS_O may be requested by the UE when UE detects certain configured conditions, for example, when the waiting time/delay of V2X message in the buffer becomes longer than pre-defined threshold. The request may be transmitted in the M_SPS_O together with the information on S_SPS_O.

The UE may or may not transmit UL transmission in S_SPS_O for the flexibility of adapting SPS transmissions to the real message generation time and message size and at the same time to achieve better resource utilization.

In certain embodiments, the UL grants in S_SPS_O for multiple UEs may have overlapping resource allocation if UL capacity becomes bottlenecked. In this case, the contention may happen in S_SPS_O. However, with the above described indication of S_SPS_O, the contention may be easily resolved by eNB for example by deactivating one of the UEs SPS allocations or reallocating the unused UL resources to one of the UEs involved in the contention in S_SPS_O. In this regard, M_SPS_O may be characterized as non-contention and must-use occasion and S_SPS_O as contention or dynamically scheduled occasion. For transmitting on S_SPS_O, UE may need to monitor PDCCH for possible C-RNTI based grant which is used by the eNB for dynamic scheduling as well as resolving pre-determined contention on S_SPS_O among different UEs.

Figure 2:
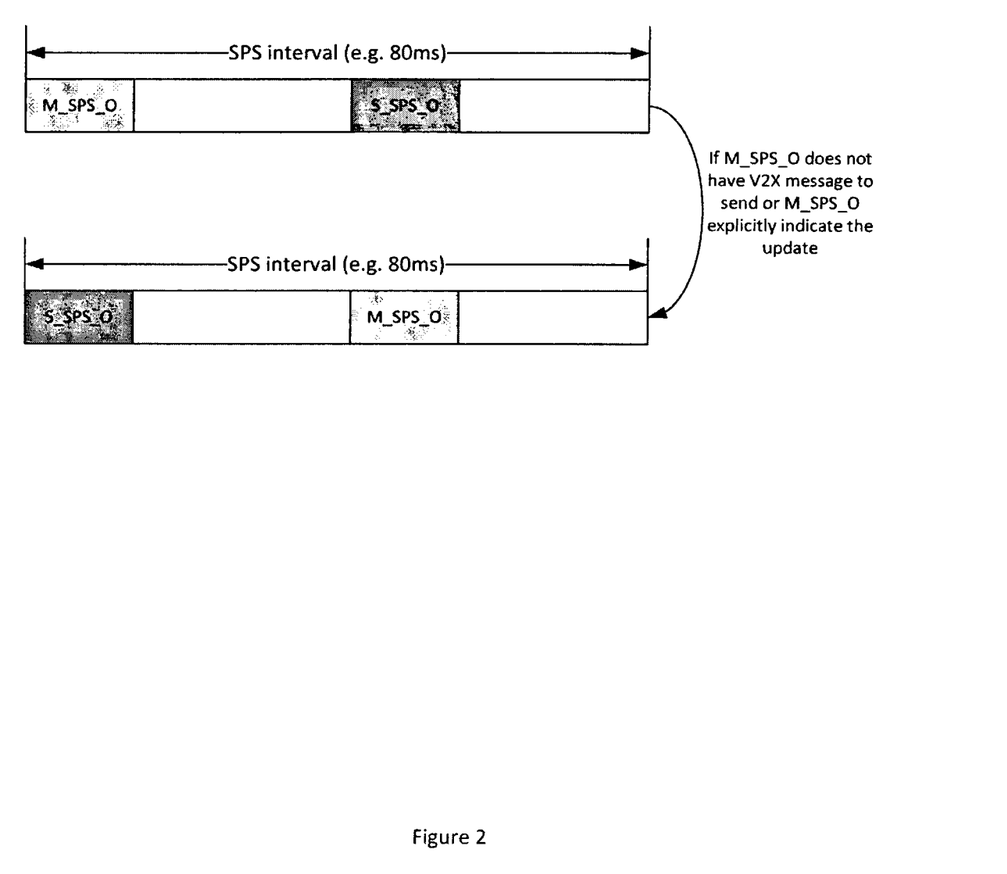
FIG. 2 illustrates a simple embodiment of SPS occasions according to certain embodiments.

FIG. 2 illustrates a simple embodiment of SPS occasions according to certain embodiments. FIG. 2 shows multiple inter-dependent SPS occasions, specifically two SPS occasions in one SPS interval. In this example, the occasions can be updated if the M_SPS_O does not have a V2X message to send or the M_SPS_O explicitly indicates the update.

As discussed above, the UE can have UL transmission in M_SPS_O according to a scheduled UL grant given by eNB. The UL transmission can include information on whether S_SPS_O will be used to transmit a further UL message and optionally to further inform on the used PRBs and MCSs of the UL transmission in S_SPS_O. The UL transmission in M_SPS_O may include the actual UL data transmission if there is data available in the UL buffer and the allocated resources allow. The scheduled UL grant in M_SPS_O may take into account the periodic V2X message traffic characteristics (for example, the message size and/or CAM message generation interval) so that M_SPS_O may be used to transmit such periodic V2X message.

S_SPS_O may be mainly used to transmit non-periodic V2X message (for example, a decentralized environmental notification message (DENM) that is event-triggered) or the part of periodic V2X message that cannot be transmitted in M_SPS_O due to the change of message size. In a typical case, the S_SPS_O may not be fully utilized for UL transmission and therefore the overlapping resource allocation of multiple UEs in high UE density may work fine with a contention resolution method as described. For instance, when multiple UEs are allocated overlapping UL PRBs in the same TTI as UL SPS grant, there is a risk of contention in UL transmission between these UEs. However, in some cases, there may be only one UE indicating that it will have UL transmission in next S_SPS_O where the overlapping UL PRBs are allocated. In this case, no contention happens. If there is more than one UE indicating data to be transmitted in the next S_SPS_O using overlapping PRBs, the eNB can solve the contention by either allowing only one UE to transmit or allowing one UE to transmit based on SPS grant and reallocating the other UEs with unused UL resources that can be either in the same TTI or even in other TTI if interval of different SPS occasions is defined by PDCCH.

If M_SPS_O is not used to transmit UL V2X message or UE requests the upgrade of S_SPS_O to M_SPS_O due to, for example, the change of V2X message generation interval or timing, the upgrade may happen implicitly for the former case or eNB may explicitly indicate the upgrade in both cases.

The UE may be allocated with, for example, one long SPS interval with many occasions or more than one shorter interval with fewer occasions per each interval. In the latter option, the mechanism according to certain embodiments may be applied on individual SPS intervals or across multiple SPS intervals with collective or aggregated number of occasions. In certain embodiments, one interval may be configured as a main interval which includes M_SPS_Os and other interval(s) as subsequent interval(s) which include S_SPS_Os corresponding to individual M_SPS_Os.

Figure 3:
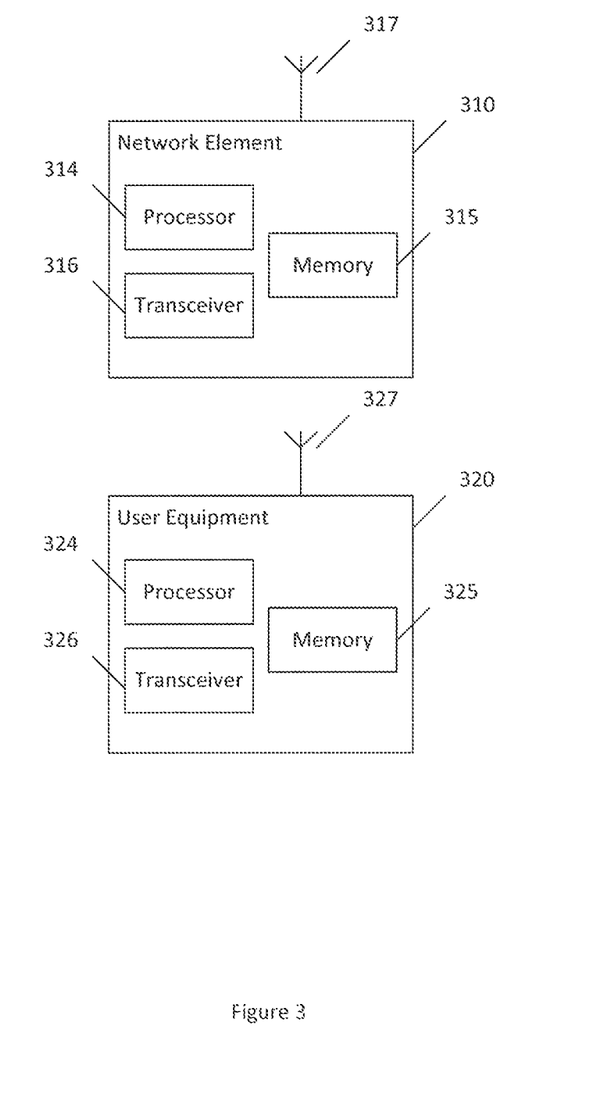
FIG. 3 illustrates a system according to certain embodiments.

FIG. 3 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element, such as a base station of a V2X system. Each of these devices may include at least one processor or control unit or module, respectively indicated as 314 and 324. At least one memory may be provided in each device, and indicated as 315 and 325, respectively. The memory may include computer program instructions or computer code contained therein, for example for carrying out the embodiments described above. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities, vehicle equipped with a radio, or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIG. 1.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 4:
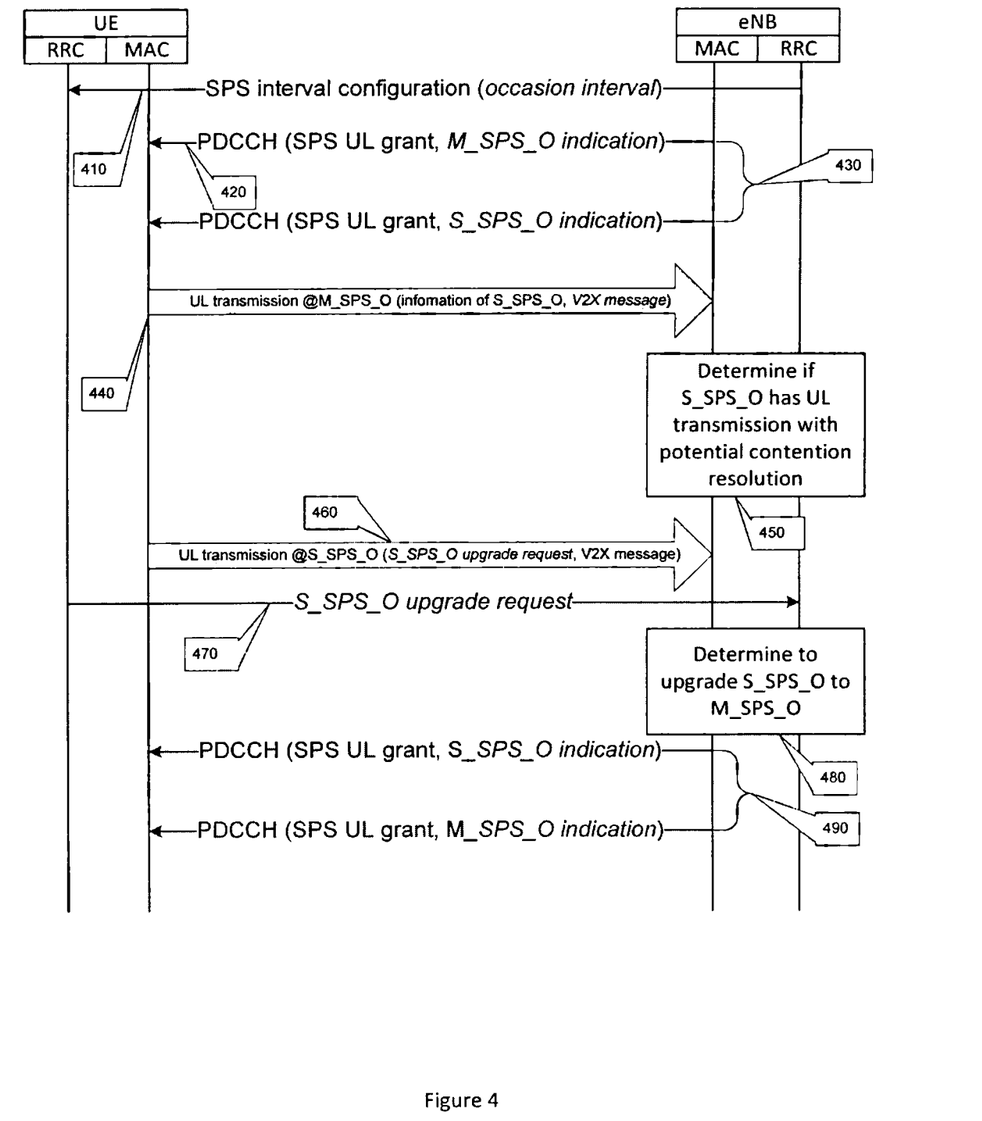
FIG. 4 illustrates a signal flow according to certain embodiments.

FIG. 4 illustrates a signal flow according to certain embodiments. As shown in FIG. 4, at 410, RRC signaling can be used to configure UL SPS interval as in legacy SPS. Optionally, multiple inter-dependent SPS occasions can be configured and the interval between them can also be configured by RRC signaling.

At 420, PDCCH can be used to configure SPS occasion on TTI level and also M_SPS_O or S_SPS_O if RRC signaling does not include such configurations. At 430, the occasion interval can be dynamically configured by eNB and implicitly indicated with two SPS UL grants. This is another option to RRC configured occasion interval in the first message.

At 440, the UE can send UL transmission at M_SPS_O, in which there can be transmitted information on S_SPS_O and optionally a V2X message, if there is message waiting for transmission.

At 450, based on the received S_SPS_O information, the eNB can determine if and how UL transmission happens at S_SPS_O. Combined with S_SPS_O information from other UEs, eNB may also need to resolve the contention.

At 460, the UE can send UL transmission at S_SPS_O if there is data available and if this transmission had been indicated to the eNB and eNB did not reschedule the UL transmission as the result of contention resolution. At, 470, the UE may request to upgrade S_SPS_O to M_SPS_O either with RRC signaling or MAC C-PDU in the UL SPS transmission.

At 480, the eNB can determine to upgrade S_SPS_O to M_SPS_O, and can consequently, at 490, send one or more UL grant(s). The first PDCCH at 490 can indicate the previous M_SPS_O changes to S_SPS_O and the second PDCCH can be used to indicate the previous S_SPS_O changes to M_SPS_O.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

BSR Buffer Status Report
C-RNTI Cell Radio Network Temporary Identifier
CAM Cooperative Awareness Message
DENM Decentralized Environmental Notification Message
RRC Radio Resource Control
SPS Semi-Persistent Scheduling
V2X Vehicle-to-X communication

What is claimed is:

1. A method, comprising:
   receiving, at a user equipment, a configuration of at least one main semi-persistent scheduling occasion;
   receiving, at the user equipment, a configuration of at least one subsequent semi-persistent scheduling occasion;
   operating the user equipment to communicate at least using the main semi-persistent scheduling occasion; and
   transmitting by using a transmission in the at least one main semi-persistent scheduling occasion, an indication from the user equipment regarding whether the configured at least one subsequent semi-persistent scheduling occasion will be used for uplink transmission.

2. The method of claim 1, wherein the configuration of the at least one main semi-persistent scheduling occasion and the at least one subsequent semi-persistent scheduling occasion comprises an indication of at least one of a semi-persistent scheduling interval, a semi-persistent scheduling occasion interval, a main semi-persistent scheduling occasion, and a subsequent semi-persistent scheduling occasion.

3. The method of claim 1, wherein the configuration of the at least one main semi-persistent scheduling occasion and the at least one subsequent semi-persistent scheduling occasion are performed using at least one of radio resource control signaling, medium access control signaling, physical layer control signaling, or any combination thereof.

4. The method of claim 1, wherein the configuration of the at least one main semi-persistent scheduling occasion and the at least one subsequent semi-persistent scheduling occasion are performed using a single grant or different grants.

5. The method of claim 1, wherein the configuration of the at least one main semi-persistent scheduling occasion is performed explicitly together with an uplink grant or implicitly.

6. The method of claim 1, wherein the transmitting comprises:
   transmitting, in a same transmission with the indication, an uplink data message.

7. The method of claim 1, wherein the indication comprises an uplink scheduling request corresponding to a size of data to be transmitted.

8. The method of claim 1, further comprising:
   initiating an update of semi-persistent scheduling allocation with the indication or in a different transmission from the indication.

9. The method of claim 8, wherein the update comprises at least one of updating physical resource blocks and a modulation and coding scheme of the semi-persistent scheduling allocation or upgrading a subsequent semi-persistent scheduling occasion to be another main semi-persistent scheduling occasion.

10. An apparatus, comprising:
    at least one processor; and
    at least one memory including computer program code,
    wherein the at least one memory and the computer program code are configured to, with the at least one processor, cause the apparatus at least to
    configure at least one main semi-persistent scheduling occasion to a user equipment;
    configure at least one subsequent semi-persistent scheduling occasion to the user equipment; and
    receive by using a transmission in the at least one main semi-persistent scheduling occasion, an indication from the user equipment regarding whether the configured at least one subsequent semi-persistent scheduling occasion will be used for uplink transmission.

11. The apparatus of claim 10, wherein when receiving the indication, the at least one memory and the computer program code are configured to, with the at least one processor, cause the apparatus to:
    receive, in a same transmission with the indication, an uplink data message.

12. The apparatus of claim 10, wherein the at least one memory and the computer program code are configured to, with the at least one processor, cause the apparatus further to:
    receive, in a same transmission with the indication or in a different transmission from the indication, an initiation of an update of semi-persistent scheduling allocation.

13. The apparatus of claim 12, wherein the update comprises at least one of updating physical resource blocks and a modulation and coding scheme of the semi-persistent scheduling allocation or upgrading a subsequent semi-persistent scheduling occasion to be another main semi-persistent scheduling occasion.

14. An apparatus, comprising:
at least one processor; and
at least one memory including computer program code,
wherein the at least one memory and the computer program code are configured to, with the at least one processor, cause the apparatus at least to:
receive, at a user equipment, a configuration of at least one main semi-persistent scheduling occasion;
receive, at the user equipment, a configuration of at least one subsequent semi-persistent scheduling occasion;
operate the user equipment to communicate at least using the main semi-persistent scheduling occasion; and
transmit by using a transmission in the at least one main semi-persistent scheduling occasion, an indication from the user equipment regarding whether the configured at least one subsequent semi-persistent scheduling occasion will be used for uplink transmission.

15. The apparatus of claim 14, wherein the configuration of the at least one main semi-persistent scheduling occasion and the at least one subsequent semi-persistent scheduling occasion comprises an indication of at least one of a semi-persistent scheduling interval, a semi-persistent scheduling occasion interval, a main semi-persistent scheduling occasion, and a subsequent semi-persistent scheduling occasion.

16. The apparatus of claim 14, wherein the configuration of the at least one main semi-persistent scheduling occasion and the at least one subsequent semi-persistent scheduling occasion are performed using at least one of radio resource control signaling, medium access control signaling, physical layer control signaling, or any combination thereof.

17. The apparatus of claim 14, wherein the configuration of the at least one main semi-persistent scheduling occasion and the at least one subsequent semi-persistent scheduling occasion are performed using a single grant or different grants.

18. The apparatus of claim 14, wherein the configuration of the at least one main semi-persistent scheduling occasion is performed explicitly together with an uplink grant or implicitly.

19. The apparatus of claim 14, wherein when transmitting the indication, the at least one memory and the computer program code are configured to, with the at least one processor, cause the apparatus to:
transmit, in a same transmission with the indication, an uplink data message.

20. The apparatus of claim 14, wherein the indication comprises an uplink scheduling request corresponding to a size of data to be transmitted.

21. The apparatus of claim 14, wherein the at least one memory and the computer program code are configured to, with the at least one processor, cause the apparatus further to:
initiate an update of semi-persistent scheduling allocation with the indication or in a different transmission from the indication.

22. The apparatus of claim 21, wherein the update comprises at least one of updating physical resource blocks and a modulation and coding scheme of the semi-persistent scheduling allocation or upgrading a subsequent semi-persistent scheduling occasion to be another main semi-persistent scheduling occasion.

* * * * *